Figure 1:
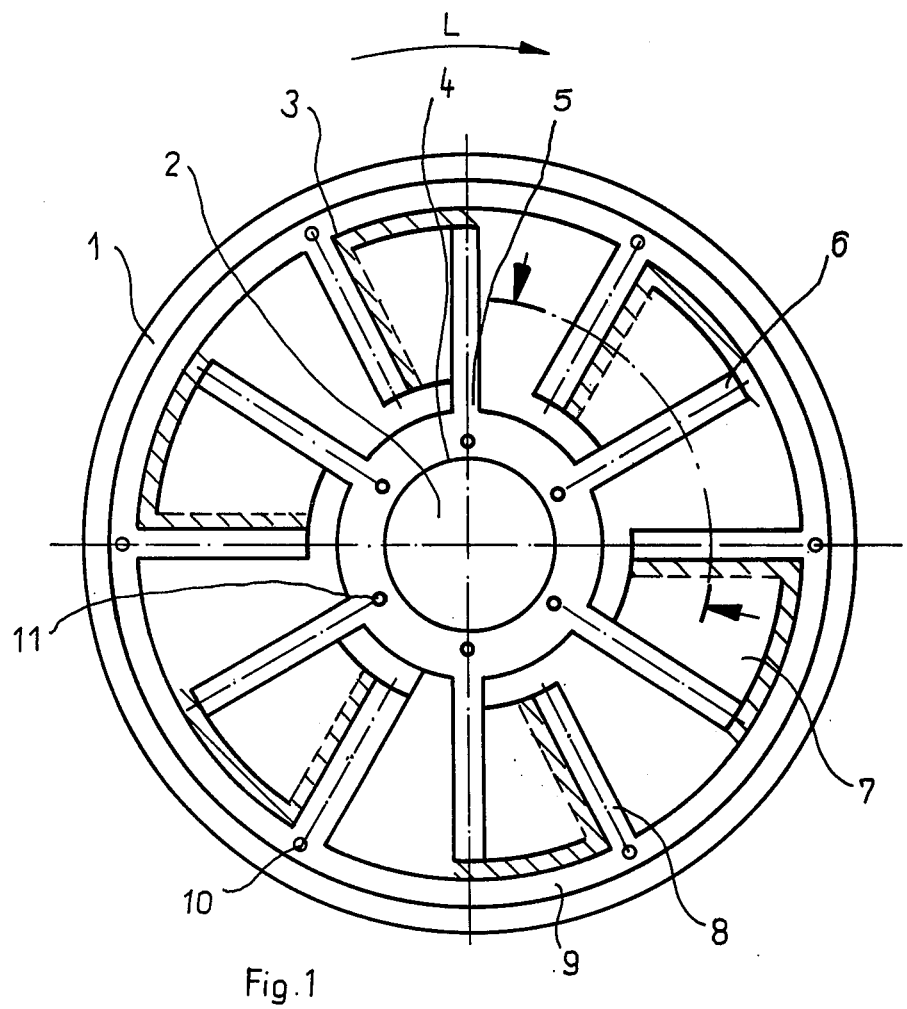

United States Patent [19]
Freytag et al.

[11] 4,383,771
[45] May 17, 1983

[54] FLUID BEARING

[76] Inventors: Oskar Freytag, 134, Lutherstrasse, 69 Jena, District of Gera; Rainer Bleyer, 22, Hermann-Duncker-Str., 6902 Jena-Lobeda, District of Gera; Volker Guyenot, 4, Otto-Eugau-Str., 69 Jena, District of Gera; Gerd Fleischer, 7, Friedrich-Naumann-Str., 3080 Magdeburg; Jügen Michael, Ba, Emma-Heintz-Str., 69 Jena, District of Gera, all of German Democratic Rep.

[21] Appl. No.: 315,971

[22] Filed: Oct. 20, 1981

[30] Foreign Application Priority Data

Nov. 28, 1980 [DD] German Democratic Rep. ... 225542

[51] Int. Cl.³ .................................................. F16C 32/06
[52] U.S. Cl. ....................................... 384/121; 384/123
[58] Field of Search ............... 384/121, 107, 369, 371, 384/123, 112

[56] References Cited

U.S. PATENT DOCUMENTS

| 2,683,636 | 7/1954 | Wilcox | 384/121 |
| 2,899,243 | 8/1959 | Acterman | 384/121 |
| 3,399,007 | 8/1968 | Remmers et al. | 384/371 |
| 4,243,275 | 1/1981 | Czuszak | 384/369 |

Primary Examiner—Lenard A. Footland

[57] ABSTRACT

The invention relates to a hydrodynamic fluid bearing of rotation symmetric shape constituted of a bearing member and a counter-bearing member the faces of each being in opposition to the other one at a narrow space. One of the members is provided with fluid pockets of levelling off depth in reverse direction to the direction of rotation of the bearing member. Thus it is feasible to cope with considerable bearing loads over a wide range of rotational speeds.

3 Claims, 2 Drawing Figures

FLUID BEARING

The invention relates to a hydrodynamic fluid bearing, preferably of cone shape, constituted of two bearing parts having rotation symmetrical bearing faces including a bearing slot in which a pressure is produced when one of the bearing parts is rotated.

Bearings of the above kind exhibit a considerable bearing capacity. The bearings are provided with a definite number of recesses in the bearing face.

Said recesses are of a constant depth and subdivide the bearing face into sectors.

The DE-Patent specification No. 2210939 (laid open) discloses a slide bearing with two bearing parts having rotation symmetric bearing faces. The recesses are arranged as a ladder rung pattern in one of the bearing faces.

Due to their arrangement upon the sliding face the recesses are hydraulically series connected and each of the rungs are connected with their suction and pressure end portion, respectively, with each other via a connection channel.

The series connection of the recesses ensures a considerably high bearing capacity of the bearing including favorable reset forces.

Said slide bearing is disadvantageous since the plurality of recesses in one bearing face renders production very complicated.

Since the depth of the recesses is constant along the entire bearing face the fluid pressure in the bearing slot is substantially independent on the rotation rate of the bearing. Thus, the bearing can only be employed for a definite range of rate of rotations in dependence on the bearing load.

It is an object of the invention to obviate the above disadvantages. It is a further object of the invention to provide a fluid bearing which is easily reproducible and permits use over a considerably wide range of revolutions.

These and other objects are realised in a hydrodynamic bearing comprising a bearing part and a bearing counter part where the fluid pressure in the inbetween bearing slot increases with a growing rate of rotations of the bearing faces.

The bearing face is provided with recesses the depths of which in the reverse direction of rotation of the one bearing part continuously decrease. The levelling off portions of the recesses are connected to fluid outlet channels.

The fluid outlet channels within one sector of the subdivided bearing face change over into radially arranged recesses which, in turn, are combined to funnel into one main channel.

Figure 2:
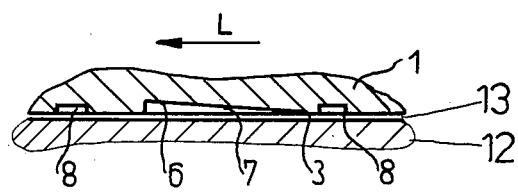

In order that the invention may be more readily understood reference is made to the accompanying drawings which illustrate diagrammatically and by way of example one embodiment thereof and where FIG. 1 is a schematic top view of a rotation symmetric bearing face of a fluid bearing including recesses, and FIG. 2 is a section of FIG. 1 along the line Z—Z.

In FIG. 1 a fluid bearing member 1 is constituted of an axle 2 and a sliding bearing face 3.

Adjacent the axle 2 a plurality of fluid inlets 11 are provided equally spaced relative to each other and along a circle line 4.

Each of the fluid inlets 11 is provided with fluid inlet recesses 5 which radially extend into elongated portions 6 which change over into fluid pockets 7.

The portions 6 subdivide the bearing face 3 into an equal number of sections. The number of inlets 11 corresponds to the number of recesses 5.

The fluid pockets 7 are limited in radial direction by fluid return recesses 8 which also extend radially to open into a main return channel 9 which runs around the circumference of the bearing member 1 in a closed circle substantially adjacent the sliding bearing area 3.

In the main channel 9 fluid outlets 10 are provided adjacent the return recesses 8.

The outlets 10 equalling in number the recesses 8 are connected to a fluid tank (not visible).

The fluid inlets 11 are also connected to the fluid tank.

In FIG. 2 a section of FIG. 1 is shown along the curved line Z—Z.

An arrow L indicates, as in FIG. 1, the sense of rotation.

The part of the bearing 1 is provided with fluid return recesses 8.

The fluid inlet recesses 5 are visible by their portion 6 which entirely opens with one side into the fluid pocket 7 which against the sense of rotation L levels off to end in the sliding face 3.

The part of the bearing 1 is opposed by a second bearing part 12 spaced apart by a slot 13.

In operation the bearing 1 which is the counter part of the top part 12 rotates in the sense of rotation L.

In the course of rotation a fluid film forms in the slot 13 between the bearing part 1 and the counter part 12 due to the effect obtained by the fluid pockets 7 levelling off in opposition to the sense of rotation.

By exploiting the centrifugal force in the course of rotation the fluid is forced into the slot 13 between both bearing parts 1 and 12 and through the inlets 11 into the recesses 5 and via the extensions 6 into the fluid pockets 7. Due to the continuously decreasing depth of the pockets 7 the fluid is increasingly compressed so that a fluid pressure is produced in the slot 13 between bearing 1 and counterbearing 12.

Again by the centrifugal force the fluid is pressed into the radially extending return recesses and via the outlets 10 to the main return channel 9.

A not shown duct system connected to the outlets and to the inlets ensures that the fluid is kept in a circulation system.

We claim:

1. A hydrodynamic fluid bearing of rotation symmetric shape comprising
 a first rotatable bearing member,
 a second non-rotating bearing member,
 an axle rigidly and centrally connected to said first member,
   said first member being movable relative to said second member about and parallel to said axle,
   said first member and said second member being provided with a bearing face each,
   said first member face and said second member face being in opposition,
   said first member face and said second member face being provided with a rim portion each,
 at least three pockets for receiving a fluid,
   each of said pockets having a first and a second limitation extending radially and in opposition to each other, at least three inlets for said fluid in the vicinity of said axle, at least three fluid recesses radially extending from said inlets in parallel to said first radial limitation of said pockets, said fluid recesses changing over into said fluid pockets, at least three fluid outlets in the vicinity of said rim portions at least three fluid return recesses radially extending along said pockets to said fluid outlets, said fluid return recesses being arranged at the side of said second radial limitation of said pockets in parallel to and being separated from the latter, each of said pockets having the greatest depth along said first radially extending limitation and the least depth along said second radially extending limitation, said pockets, said inlets, said outlets, said fluid recesses, said fluid return recesses being uniformly distributed in one of said bearing member faces, means for connecting said outlets to said inlets remote from the bearing faces.

2. A hydrodynamic fluid bearing as claimed in claim 1, wherein the depth of said fluid pockets along said first radially extending limitation equals the depth of said fluid recesses, and said second radial limitation having the same depth as said respective bearing face.

3. A hydrodynamic fluid bearing, as claimed in claim 2, wherein a first annular channel is provided in the vicinity of said axle for connecting said fluid inlets with each other and a second annular channel in the vicinity of said rim portion connecting said outlets with each other, said fluid recesses originating in said first channel, and said fluid return recesses open out in said second channel.

* * * * *